(12) United States Patent
Kobayashi et al.

(10) Patent No.: US 6,729,764 B2
(45) Date of Patent: May 4, 2004

(54) METAL BEARING LINER AND AXIAL FLOW FAN MOTOR PROVIDED WITH THE SAME

(75) Inventors: Eiichi Kobayashi, Miyota (JP);
Kazunori Sawayama, Miyota (JP);
Kaoru Matsumoto, Miyota (JP)

(73) Assignee: Minebea Co., Ltd., Miyota (JP)

( * ) Notice: Subject to any disclaimer, the term of this patent is extended or adjusted under 35 U.S.C. 154(b) by 0 days.

(21) Appl. No.: 09/987,174

(22) Filed: Nov. 13, 2001

(65) Prior Publication Data

US 2002/0061145 A1 May 23, 2002

(30) Foreign Application Priority Data

Nov. 22, 2000 (JP) .......................................... 2000-356176

(51) Int. Cl.7 ............................................... F16C 43/00
(52) U.S. Cl. ........................ 384/295; 384/296; 384/535
(58) Field of Search ................................. 384/537, 295, 384/296, 297

(56) References Cited

U.S. PATENT DOCUMENTS

| 3,924,908 | A | | 12/1975 | Gotham et al. | |
| 4,746,231 | A | * | 5/1988 | Hoshino | 384/537 |
| 4,783,608 | A | | 11/1988 | Gruber et al. | |
| 4,955,791 | A | | 9/1990 | Wrobel | |
| 5,319,851 | A | * | 6/1994 | Ikezawa et al. | 384/297 |
| 6,312,159 | B1 | * | 11/2001 | Ishida et al. | 384/294 |

FOREIGN PATENT DOCUMENTS

| DE | 42 24 817 A1 | 2/1994 |
| EP | 0 011 957 A1 | 6/1980 |

* cited by examiner

Primary Examiner—Lenard A. Footland
(74) Attorney, Agent, or Firm—Oliff & Berridge, PLC (57) ABSTRACT

A metal bearing liner is formed by deep drawing press process sequentially subjecting a progressive sheet material (roll material) to a plurality of press processes. This makes it possible to form a metal bearing liner by a press work instead of a cutting work that has been conventionally employed while maintaining a requisite accuracy such as roundness and cylindricality thereby remarkably reducing the manufacturing cost of the metal bearing line thereby.

2 Claims, 7 Drawing Sheets

METAL BEARING LINER AND AXIAL FLOW FAN MOTOR PROVIDED WITH THE SAME

BACKGROUND OF THE INVENTION

1. Field of the Invention

The invention relates to a metal bearing liner and an improved axial flow fan motor provided with the same.

2. Description of Related Art

Various types of office automation (OA) apparatuses have a large number of electronic circuits enclosed in the housing thereof, whereby heat may be generated by the electronic circuits giving a bad influence on some of electronic devices of the apparatus. The remarkable technical advancement of a microprocessor unit (hereinafter referred to as "MPU") for a personal computer (PC) has been realized leading to a further improvement for higher-integration, higher respond speed and higher-functionality. On the other hand, the heat generated by the MPU has been continuously increased in its amount contrary to the fact that the housing space tends to be reduced in order to downsize the main body of the apparatus. Accordingly, it has become an important technical task to devise effective measures against heat.

Figure 7:
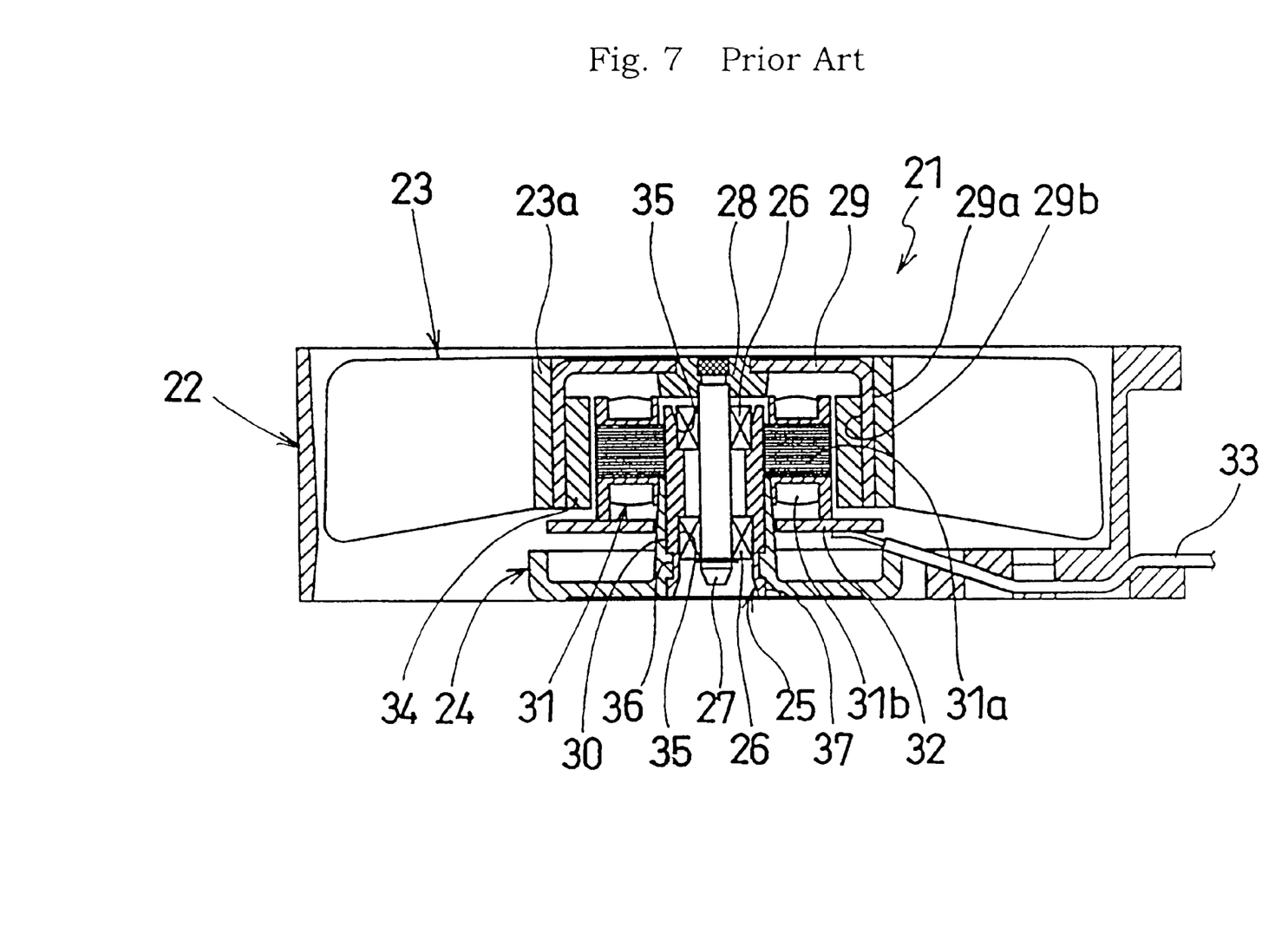
FIG. 7 is a cross section showing a general axial-flow fan motor provided with a metal bearing liner formed by cutting work.
Figure 8:
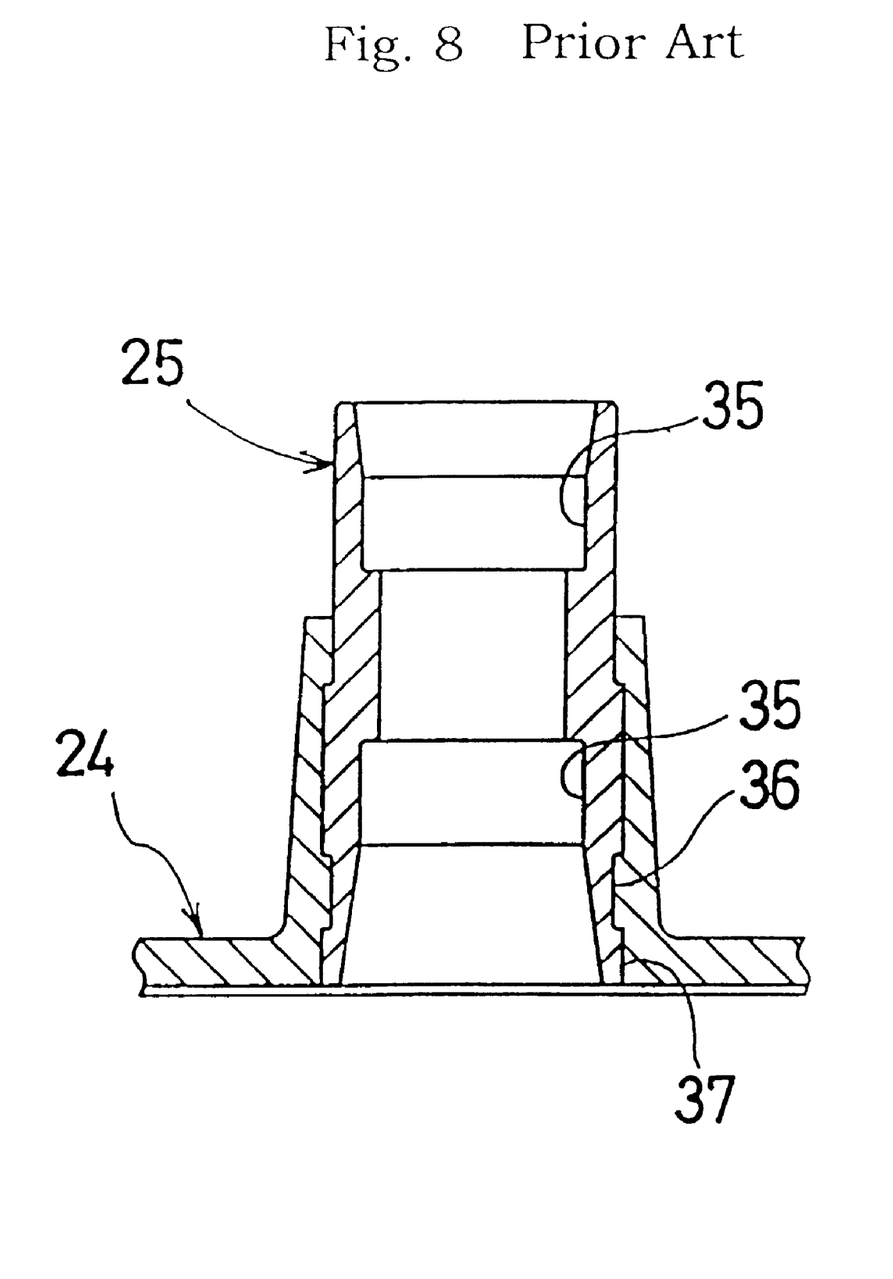
FIG. 8 is a cross section showing a metal bearing liner generally formed by cutting work.

An OA apparatus in general is provided with a ventilation hole formed on a side wall of the housing thereof, and an axial flow fan motor 21 (see FIG. 7) is provided on the back side wall of the ventilation hole (inside of the housing) in order to radiate the generated heat from the MPU to the outside of the housing. The axial flow fan motor 21 shown in FIG. 7 is one of the examples of the axial flow type fan motors wherein an impeller 23 rotates in a resin-made casing 22. As shown in FIGS. 7 and 8, a motor housing 24 is integrally formed with the casing 22 at the substantially center thereof, and a substantially cylindrical metal bearing liner 25 formed by an insert molding is set so as to stand at the center of the motor housing 24.

As shown in FIG. 7, the outer peripheral surfaces of a pair of bearings 26 are fitted and fixed on the inner peripheral surface of the bearing liner 25 in such a manner that a shaft 27 is rotatably supported by those bearings 26. Moreover, a motor yoke 29 is fixed to the shaft 27 through a zinc die-cast-made bush 28. The base portion 23a of the impeller 23 is fixed on the outer peripheral surface 29a of the motor yoke 29, and a magnet 34 is disposed on the inner peripheral surface 29b of the yoke 29. And, the shaft 27, the motor yoke 29, the impeller 23 and the magnet 34 constitute a rotary part.

Furthermore, as shown in FIG. 7, a stator 31 composed of a stator core 31a and stator wire 31b wound therearound is fitted on the outer peripheral surface 30 of the bearing liner 25. A PC board 32 composed of electronic circuits is provided beneath the stator 31. In the present axial flow fan motor 21, the PC board 32 controls the current to be supplied to the stator 31. A reference numeral 33 in FIG. 7 refers to a lead wire for supplying a power source current to the electronic circuits on the PC board 32.

The axial flow fan motor 21 thus structured is required to obtain a high cooling performance, a low current consumption, quietness, and a long life. Accordingly, the bearings 26 for supporting the rotary part are needed to reduce torque and noise and to elongate the life. Furthermore, the bearing liner 25 holding the bearings 26 is required to have a high roundness and cylindricality in its bearing fitting portions 35 (see FIG. 8) to which the outer rings of the bearings 26 are fitted. Consequently, the conventional bearing liner 25 has been formed by a cutting work in order to obtain a high accuracy. That is, the outer peripheral surface 30 has to be provided so as to form a ring-shaped groove 36 preventing the fall out of the bearing liner 25 and a knurl 37 preventing the rotation of the bearing liner 25. Such cutting work of the bearing liner 25 is intricate and requires frequent tooling change and many process, which increase the manufacturing cost of the bearing liner 25 resulting in the cost increase of the axial flow fan motor 21.

SUMMARY OF THE INVENTION

The present invention was made in light of the above, and it is an object of the present invention to provide a metal bearing liner and an axial flow fan motor provided with the same formed by an insert molding to the resin-made motor housing thereof. In the present invention, the metal bearing liner conventionally formed by a cutting work can be formed by a press work while maintaining a requisite accuracy so that the manufacturing cost of the metal bearing liner, that is, the cost of the axial flow fan motor is reduced.

For attaining the aforementioned object, according to the first aspect of the present invention, there is provided a metal bearing liner formed into a substantially cylindrical shape and performed for an insert molding to a resin-made motor housing, which has an inner peripheral surface to which a bearing for supporting a shaft of a rotary part is fitted, wherein the metal bearing liner is formed by sequentially performing a plurality of press processes over a progressive sheet material.

In the aforementioned structure, the metal bearing liner with a requisite accuracy can be obtained through the press work.

According to the second aspect of the present invention, a plurality of projecting portions for positioning the bearing are provided on the inner peripheral surface of the bearing liner.

In the aforementioned structure, the bearing can be positioned in the axial direction of the bearing liner.

According to the third aspect of the present invention, a flange is provided at the base portion of the bearing liner and a notch is disposed at a side edge of the flange.

In the aforementioned structure, because the insert molding is performed for the metal bearing liner to a resin-made motor housing, the flange can prevent the come out of the bearing liner and the notch can also prevent the rotation of the bearing liner.

According to the fourth aspect of the present invention, the insert molding is performed for the bearing liner to the motor housing by inpouring a resin into recesses formed on the back of the projecting portions.

In the aforementioned structure, it will be possible to perform the insert molding for the bearing liner to the motor housing, by which the resin inpours into the recesses of the bearing liner, so that the come out as well as the rotation of the bearing liner with respect to the motor housing can be prevented.

According to the fifth aspect of the present invention, there is provided the axial flow fan motor including the metal bearing liner formed into a substantially cylindrical shape and performed for the insert molding to the resin-made motor housing in such a manner that the bearing liner stands therein, in which the metal bearing liner is formed by sequentially performing a plurality of press processes over a progressive sheet material In the aforementioned structure, the metal bearing liner can be formed through the press work (progressive press work) instead of conducting the conventional cutting work when performing the insert molding to the motor housing in the axial flow fan motor.

DETAILED DESCRIPTION OF PREFERRED EMBODIMENTS

A metal bearing liner and an axial flow fan motor provided with the same according to the present invention will be hereinafter described referring to FIGS. 1 to 6. A metal bearing liner 2 of the present embodiment will be briefly described. The metal bearing liner 2 is performed for an insert molding to a resin-made motor housing 3 of an axial flow fan motor 1 (see FIG. 3). This is called as a progressive press work that performs the press work over a progressive sheet material in sequence. Consequently, the bearing liner 2 can be formed by the press work instead of conducting the conventional cutting work (see FIG. 8) while maintaining a requisite accuracy thereby remarkably reducing the cost of the metal bearing liner 2.

Figure 2:
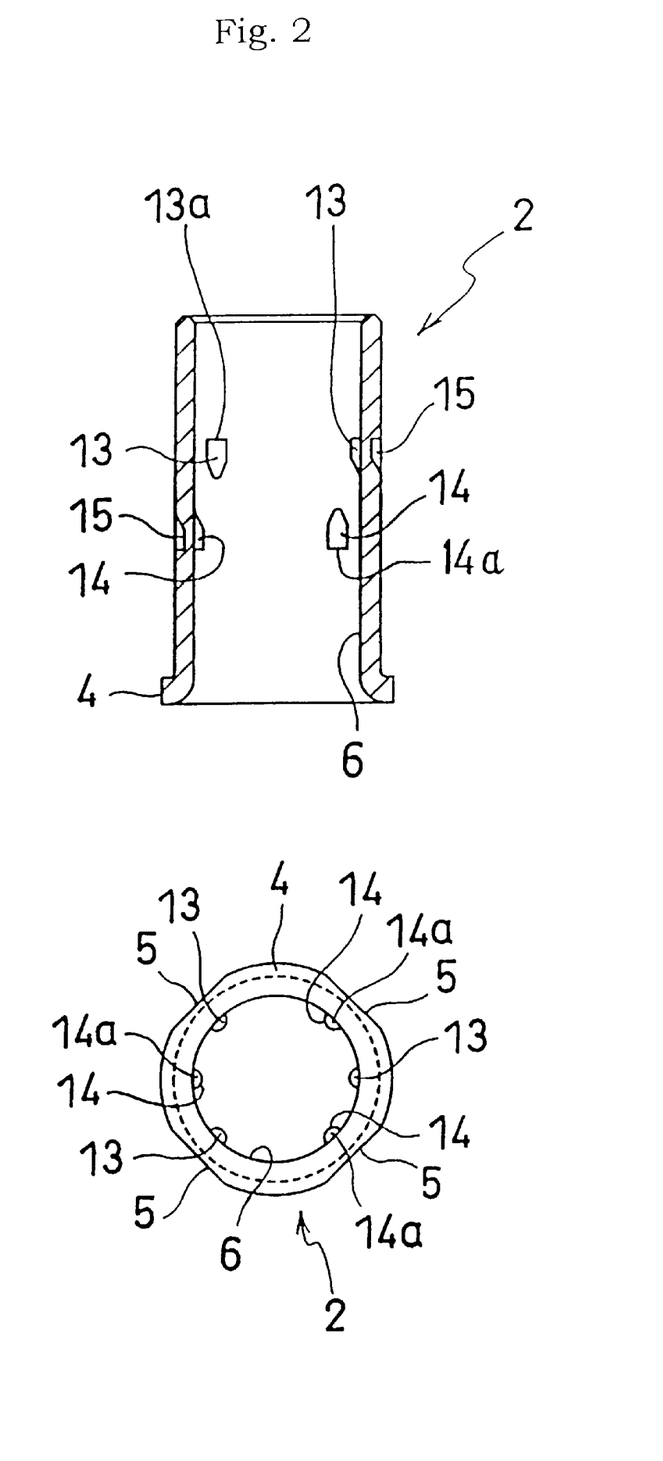
FIG. 2 illustrates explanatory views of the metal bearing liner of the embodiment.

Next, the metal bearing liner 2 of the embodiment will be described in detail. As shown in FIG. 2, the metal bearing liner 2 of the embodiment is formed into a substantially cylindrical shape. It is provided with a flange 4 having a plurality of notches 5 (disposed at four positions in the embodiment), on the side edge of the base portion side (the side to be embedded into the motor housing 3 of the axial flow fan motor 1). Moreover, the inner peripheral surface 6 of the bearing liner 2 is defined by a predetermined geometrical tolerance (such as roundness and cylindricality). The outer rings of a pair of bearings 7, 8 for supporting a rotary part of the axial flow fan motor 1 (see FIG. 3) are fitted to the inner peripheral surface 6.

Moreover, formed on the inner peripheral surface 6 are a plurality of upper side annular projecting portions 13 (disposed at three positions in the embodiment) and a plurality of lower side annular projecting portions 14 (disposed at three positions in the embodiment), both being formed by dies 9 to 12 for side slits (see FIGS. 5 and 6), which will be described later. The metal bearing liner 2 of the embodiment has a structure in which the outer ring of the bearing 7 (see FIG. 3) inserted from the upper side of the inner peripheral surface 6 is brought into abutment against the stopper surfaces 13a of the plural upper side projecting portions 13. The outer ring of the bearing 8 inserted from the lower side of the inner peripheral surface 6 is also brought into abutment against the stopper surfaces 14a of the plural lower side projecting portions 14. As a result, a pair of the bearings 7, 8 are held at a prescribed interval therebetween.

Figure 1:
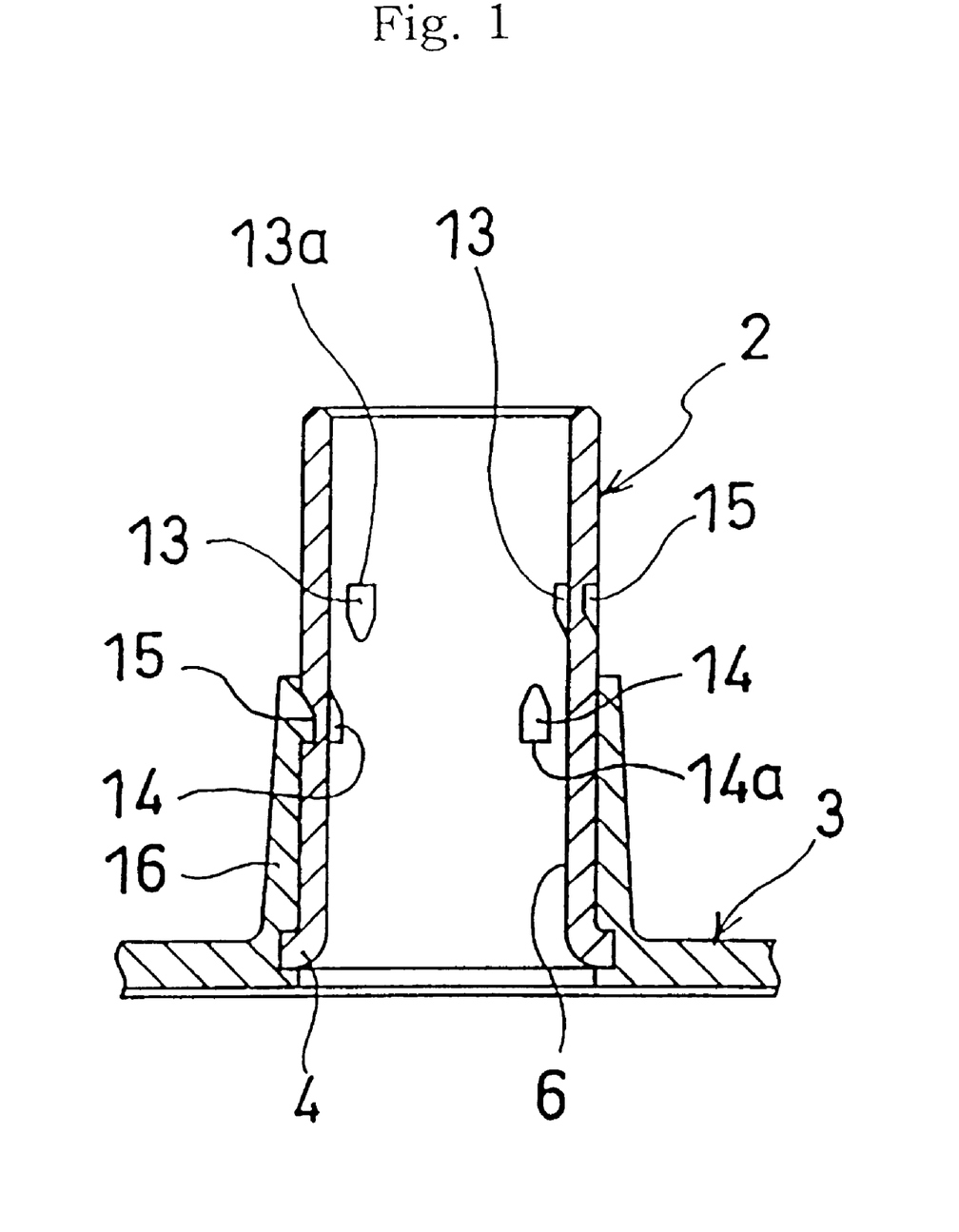
FIG. 1 is a cross section as an explanatory view showing the state where a metal bearing liner of an embodiment of the present invention is insert molded to a boss of a motor housing.

As shown in FIG. 1, both side edges of the upper side of the bearing liner 2 are chamfered by means of a chamfering die (not shown) such that the bearing 7 can be easily inserted from upward. Moreover, referring to FIG. 2, recesses 15 are formed on the respective opposite sides of the projecting portions 13, 14 of the bearing liner 2, which have been formed with the dies 9 to 12 for side slits (see FIGS. 5 and 6).

Figure 3:
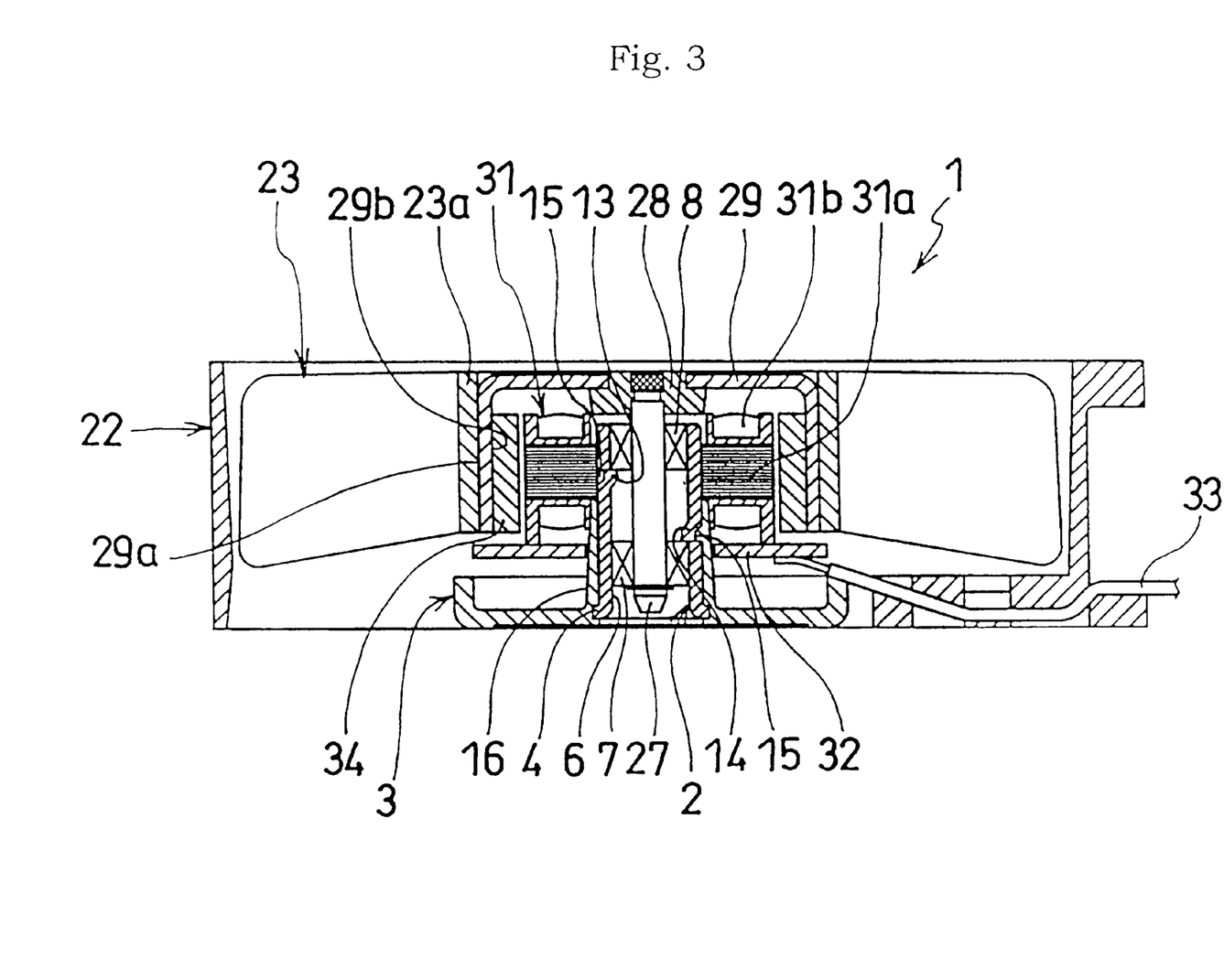
FIG. 3 is an explanatory view showing an axial flow fan motor provided with the metal bearing motor of the embodiment.

Next, the axial flow fan motor 1 provided with the metal bearing liner 2 of the present embodiment will be briefly described. The same elements as those of the aforementioned general axial flow fan motor 21 (see FIG. 7) are designated as the same name with the same reference numerals, thus the explanation relating to those elements will be omitted. As shown in FIGS. 1 and 3, the axial flow fan motor 1 of the present embodiment is provided with a resin-made motor housing 3 to which the metal bearing liner 2 is performed for the insert molding. Since the bearing liner 2 is formed by the press work instead of conducting the conventional cutting work, the cost of the bearing liner 2 can be remarkably reduced, which leads to the reduction of the manufacturing cost in the axial flow fan motor 1.

And, the axial flow fan motor 1 of the present embodiment will be described in detail. As shown in FIGS. 1 and 3, a boss 16 is integrally formed at the center of the resin-made motor housing 3. The base portion of the metal bearing liner 2, which is formed by the above press work (the progressive press work), is conducted for the insert molding to the boss 16. Accordingly the flange 4 formed at the base portion is embedded in the inner peripheral surface of the boss 16. This can prevent fall out of the bearing liner 2 (the movement in the axial direction) from the motor housing 3. A plurality of notches 5 disposed on the flange 4 can also prevent the rotation of the bearing liner 2 around the center axis thereof (see FIG. 2).

Furthermore, as shown in FIGS. 1 and 3, the boss 16 extends to the height of the stopper surfaces 14a of the lower side projecting portions 14 in the axial flow fan motor 1 of the present embodiment. This can prevent fall out of the bearing liner 2 (the movement in the axial direction) from the motor housing 3 and the rotation of the bearing liner 2 around the center axis with the aforementioned structure where resin inpours into the recesses 15 formed on the opposite of the lower side projecting portions 14 when performing the insert molding for the bearing liner 2 to the motor housing 3. And, the boss 16 may further be extended to the height for covering the recesses 15.

Next, referring to FIG. 4, the manufacturing processes of the metal bearing liner 2 of the present embodiment will be described in its order.

(a) TRIMMING PROCESS

Figure 4:
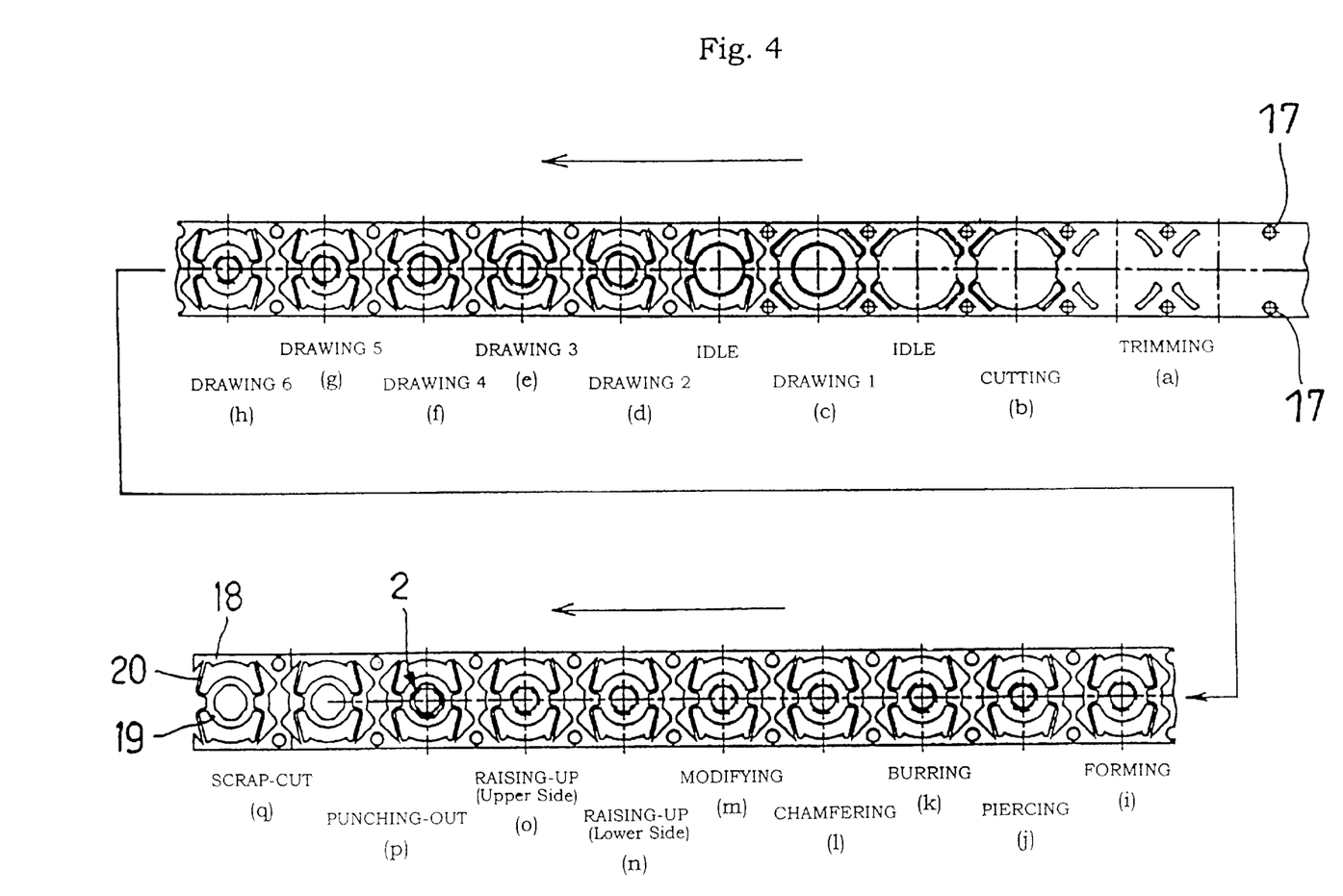
FIG. 4 is an explanatory view for illustrating each manufacturing process (each of manufacturing processes by the progressive press work) of the metal bearing liner of the embodiment.

A trimming process performs a window punching for forming crosspieces 20 that connect an outer frame 18 with an inner frame 19 (see process (q) in FIG. 4) with respect to pilot holes 17 formed in a sheet material (roll material) by a punching work with a trimming die (not shown).

(b) CUTTING PROCESS

A cutting process cuts the outer shapes of the crosspieces 20 and the inner frame 19 to be processed by a drawing work in a subsequent process.

(c)–(h) DRAWING PROCESS

In a drawing process, the inner frame 19 is processed by a drawing work so as to form into a cylindrical shape with a bottom, which has flanges at its opening. The geometrical tolerance (such as roundness and cylindricality) required for the inner peripheral surface 6 of the bearing liner 2 can be achieved in the press work by performing a deep drawing process (drawing rate: 25%) toward the inner frame 19, the process of which is divided into six steps. In this embodiment, the drawing process is divided into six steps where the deep drawing work is performed at 25% to manufacture the metal bearing liner 2 so as to achieve the requisite accuracy of the inner peripheral surface 6. Note that the number of the steps and the drawing rate are not limited to the above-identified values.

(i) FORMING PROCESS

The forming process performs a finish forming of the bearing liner 2 subsequent to the drawing process. Then, the final sizing (accuracy) of the inner peripheral surface 6 of the bearing liner 2 is performed.

(j) PIERCING PROCESS

The piercing process pierces the bottom of the bearing liner 2 which has been formed into the cylindrical shape with the bottom in the drawing process.

(k) BURRING PROCESS

The pierced edge portion (not shown) of the bearing liner 2 subsequent to the piercing process is bent inward (in the axial direction of the bearing liner 2). Accordingly, the bent edge portion of the bearing liner 2 in the burring process is straightened with a burring die (not shown).

(l) CHAMFERING PROCESS

The annular edge portion of the bearing liner 2 straightened in the burring process has a sheared surface with a wave-like shape resulting from the piercing process. Accordingly, in the chamfering process, surfaces are formed (chamfering in the cutting process) on both side edges with a chamfering die (not shown). As a result, the tip of the metal bearing liner 2 of the embodiment can be easily inserted into the bearing liner fitting section of a die (not shown) for holding a bearing liner when performing the insert molding for the bearing liner 2 to the resin-made motor housing 3. Additionally the upper side bearing 7 (see FIG. 3) can be easily inserted on the inner peripheral surface 6 for assembly of the bearing 7.

(m) MODIFYING PROCESS

The modifying process modifies distortion generated in the bearing liner 2 resulting from the chamfering process with a modification die (not shown).

(n) SIDE SLITS PROCESS (LOWER SIDE)

Figure 5:
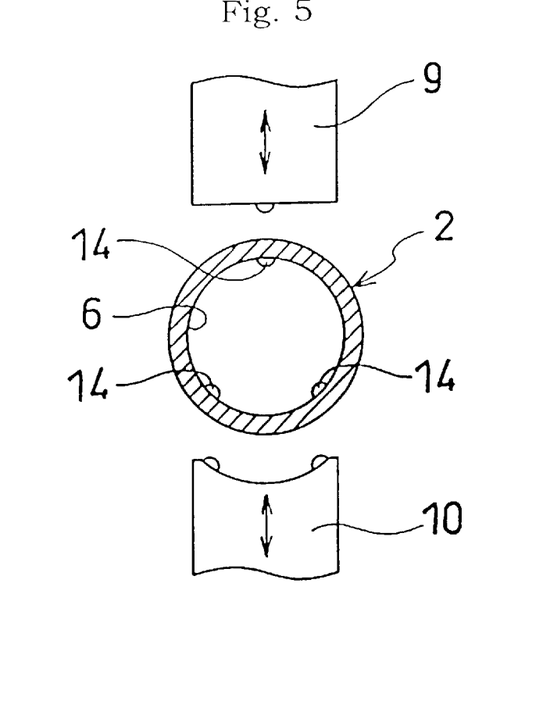
FIG. 5 is a cross section illustrating a side slits on the lower side in the manufacturing processes (manufacturing processes by the progressive press work) of the metal bearing liner of the embodiment.

In the side slits process (lower side) as shown in FIG. 5, the lower side projecting portions 14 are formed on the bearing liner 2 with dies 9, 10 for side slits, which mutually get closer or away by driving a cam mechanism (not shown) in the vertical direction of FIG. 5. The three lower side projecting portions 14 are not disposed at even intervals around the axial line of the bearing liner 2 as shown in FIG. 5. The lower side projecting portions 14 and the stopper surfaces 14a are slit up so as to prevent fractures on the inner peripheral surface 6. Accordingly, sealing is made so as to prevent the resin that inpours into the recesses 15 on the opposite of the lower side projecting portions 14 from flowing onto the inner peripheral surface 6. Then, the end surface of the bearing is reliably brought into abutment against the stopper surfaces 14a so as to attain an accurate positioning. This applies to the upper side projecting portions 13 and the stopper surfaces 13a.

(o) SIDE SLITS PROCESS (UPPER SIDE)

Figure 6:
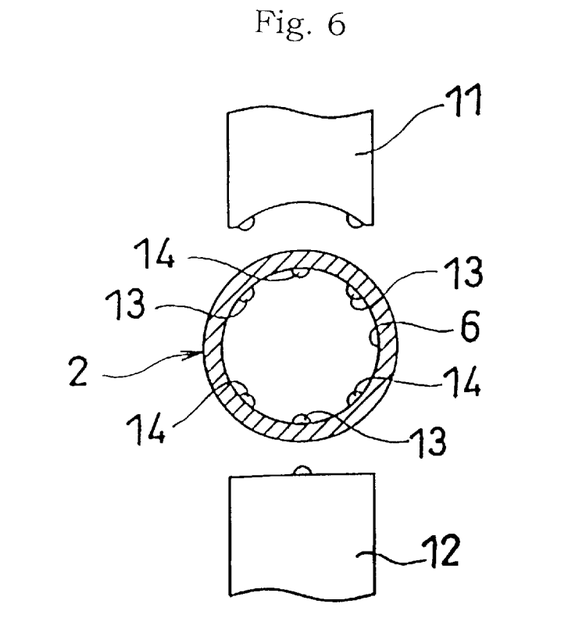
FIG. 6 is a cross section illustrating a side slits on the upper side in the manufacturing processes (manufacturing processes by the progressive press work) of the metal bearing liner of the embodiment.

In the side slits process (upper side), as shown in FIG. 6, the upper side projecting portions 13 are formed on the bearing liner 2 with dies 11, 12 for forming the upper side projecting portions, which mutually get closer or away by driving a cam mechanism (not shown) in the vertical direction of FIG. 6. The three upper side projecting portions 13 are not disposed at even intervals around the axial line of the bearing liner 2 as shown in FIG. 6.

(p) PUNCHING-OUT PROCESS

In the punching-out process, the notches 5 disposed on the flange 4 of the bearing liner 2 are formed (see FIG. 2) with a prescribed punching die (not shown). The bearing liner 2 is also punched out from the inner frame 19, and the punched out metal bearing liner 2 is stocked as the product in a stocker (not shown).

(q) SCRAP-CUT PROCESS

The scrap-cut process cuts a scrap portion with a die for scrap-cutting (not shown).

The metal bearing liner 2 of the present embodiment is produced by sequentially subjecting the progressive sheet material (roll material) to the trimming process, the cutting process, the drawing process, the forming process, the piercing process, the burring process, the chamfering process, the modifying process, the side slits process (both the lower side and the upper side), the punching-out process, and the scrap-cut process. This makes it possible to use the press work for forming the metal bearing liner 25 (see FIGS. 7 and 8) that has been conventionally formed by the cutting work while maintaining the requisite accuracy (roundness, cylindricality and the like).

The respective operations of the above-structured metal bearing liner 2 and the axial flow fan motor 1 provided therewith will be hereinafter described. The metal bearing liner 2 of the present embodiment is formed by sequentially performing the plural press work steps over the sheet material (roll material) which is sequentially sent. This makes it possible to form the metal bearing liner 25 by the press work (progressive press work) instead of performing the conventional cutting work (see FIGS. 7 and 8) while maintaining the requisite accuracy (roundness, cylindricality and the like). The resultant cost for manufacturing the metal bearing liner 2 is remarkably reduced so as to meet the requirement of the mass production of the metal bearing liner 2.

The upper side projecting portions 13 for positioning the bearing 7 to be inserted from an upper side and the lower side projecting portions 14 for positioning the bearing 8 to be inserted from a lower side are formed on the inner peripheral surface 6 of the metal bearing liner 2 having a substantially cylindrical shape. The aforementioned upper and lower side projecting portions 13, 14 serve to position a pair of bearings 7, 8 in the axial direction of the bearing liner 2.

Furthermore, the metal bearing liner 2 of the present embodiment has the flange 4 on its base portion, and the notches 5 are formed on the side edge of the flange 4. When performing the insert molding for the metal bearing liner 2 to the resin-made motor housing 3, the flange 4 is embedded in the boss 16 of the motor housing 3 so as to prevent fall out of the bearing liner 2. The notches 5 formed on the flange 4 serve to prevent the rotation of the bearing liner 2.

In the insert molding for the metal bearing liner 2 to the resin-made motor housing 3, the action of the bearing liner 2 to the motor housing 3 can be regulated by the resin inpouring into the recesses 15 formed on the back of the lower side projecting portions 14. As a result, the fall out and the rotation of the metal bearing liner 2 can be prevented.

The metal bearing liner 25 is subjected to the progressive press work in which a plurality of press processes are performed over a progressive sheet material (roll material) sequentially instead of conducting the conventional cutting work when performing the insert molding to the motor housing 3. As a result, the cost of the metal bearing liner 2 can be remarkably reduced thereby decreasing the manufacturing costs of the axial flow fan motor 1 provided with the metal bearing liner 2 of the present embodiment.

What is claimed is:

1. A metal bearing liner formed into a substantially cylindrical shape and a resin-made motor housing integrated by an insert molding process, comprising:

an inner peripheral surface of the metal bearing liner with which a couple of bearings for supporting a shaft of a rotary part are fitted;

a plurality of projecting portions formed on the inner peripheral surface of the metal bearing liner for positioning the couple of bearings held at a prescribed interval; and a plurality of recesses formed on an outer peripheral surface of the metal bearing liner, radially corresponding to the plurality of projecting portions in which the metal bearing liner embeds with the resin-made motor housing by performing the insert molding process in such a manner as to inpour resin into the plurality of recesses.

2. A metal bearing liner according to claim 1, further comprising a flange portion with a plurality of notches for preventing the metal bearing liner from being rotated to the motor housing.

* * * * *